United States Patent [19]
Picunko

[11] 3,895,278
[45] July 15, 1975

[54] ROTOR ACCELERATION CONTROL CIRCUIT

[75] Inventor: Thomas Picunko, Bronxville, N.Y.

[73] Assignee: Union Carbide Corporation, New York, N.Y.

[22] Filed: Oct. 3, 1973

[21] Appl. No.: 403,274

[52] U.S. Cl. ............... 318/421; 318/227; 318/229; 318/327; 318/359; 318/515
[51] Int. Cl. ............................................ H02p 1/04
[58] Field of Search .......... 318/415, 421, 327, 396, 318/227, 229, 515, 508, 422, 349, 359, 345

[56] References Cited
UNITED STATES PATENTS

| | | |
|---|---|---|
| 3,136,933 | 6/1964 | Whitemore et al. ............ 318/396 X |
| 3,549,972 | 12/1970 | Callan ................. 318/327 |
| 3,581,175 | 5/1971 | Merz ................. 318/327 X |
| 3,586,946 | 12/1969 | Sadashige ............... 318/398 X |

*Primary Examiner*—B. Dobeck
*Attorney, Agent, or Firm*—F. J. McCarthy

[57] ABSTRACT

An acceleration control circuit for a motor driven rotor which varies the voltage applied to the drive motor so as to achieve a desired rotor acceleration. The aforementioned control circuit includes a resistance means in circuit with the drive motor and means for short circuiting the resistance means under certain conditions of motor acceleration.

1 Claim, 2 Drawing Figures

ROTOR ACCELERATION CONTROL CIRCUIT

The present invention is directed to an electrical circuit for controlling the acceleration of an electrically driven rotor device. More particularly, the present invention is directed to a circuit for comparing the acceleration of an electrically driven rotor with a desired acceleration and adjusting the rotor acceleration to maintain the desired acceleration.

With electrically driven rotor devices, such as centrifugal type chemical analyzers, as described in "Analytical Biochemistry" 28,545–562 (1969) the acceleration from rest to operating speed is of critical importance. In such devices, an electrically driven rotor contains radially aligned cavities into which liquid reagents and serum are initially separately loaded, such materials to be mixed and passed for photometric analysis to a radially aligned cuvette by the centrifugal force developed by the acceleration of the rotor. It is important that the reagent and serum be rapidly advanced to the cuvettes to avoid premature reaction outside the cuvettes while at the same time avoiding loss of materials due to too high an acceleration of the rotor. However, even relatively minor differences in the mechanical and electrical components of the rotor mechanism can, over a period of time, cause undesirable variations in rotor acceleration.

It is therefore an object of the present invention to provide an electrical control circuit for maintaining a desired acceleration in the operation of an electrically driven rotor device.

Figure 1:
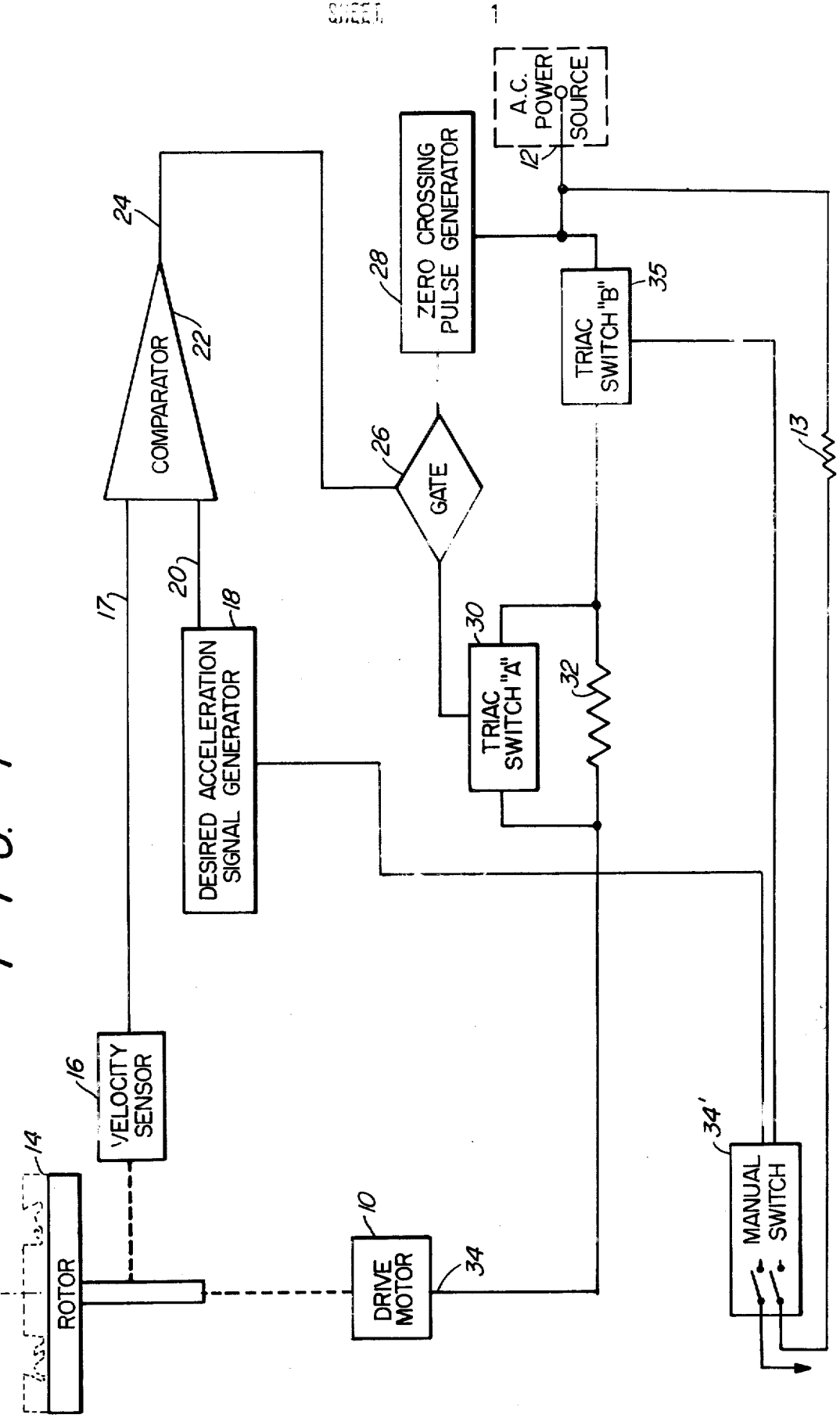

Other objects will be apparent from the following description and claims taken in conjunction with the drawing in which FIG. 1 shows a schematic arrangement of the control circuit of the present invention.

With reference to FIG. 1, a drive motor 10, adapted to be energized from alternating power source 12, is coupled mechanically to a rotor device 14 which can be a centrifugal type analyzer of the type previously noted and indicated in dotted lines in FIG. 1. The alternating power source can be standard line a.c. voltage or other voltage supply which periodically goes to zero voltage, e.g., full wave rectified direct current. A velocity sensor 16 is coupled to rotor 14 and provides an output voltage signal corresponding to the instantaneous velocity of the rotor and which varies with the change in rotor velocity, thus providing an indication of the acceleration of the rotor 14. The velocity sensor 16 can be conventional tachometer device which provides a continuous electrical signal at 17, the magnitude of which corresponds to and varies in time with the velocity of rotor 14. A signal generator 18, which can be a conventional ramp generator, provides an electrical output signal at 20 which varies in time and which corresponds to the desired acceleration, i.e., the desired velocity at any instant, of the rotor 14. The appropriate signal to be provided by signal generator 18 can be determined empirically for any given rotor arragement, simply by use of a tachometer coupled to the rotor, with the tachometer output driving a standard chart recorder, and then adjusting the output of signal generator 18 until the most rapid satisfactory acceleration is achieved which is when the chart recorder indicates an acceleration conforming to a predetermined optimum acceleration. The predetermined optimum acceleration for a given rotor can be determined by subjecting the rotor to increasing accelarations to obtain the highest acceleration at which the rotor functions acceptably. For example, with the rotor arrangement of a centrifugal analyzer of the type noted above, the highest acceptable acceleration can be determined by using high speed photographic techniques to examine transfer of reagents and serum to cuvettes. The signals at 17 and 20 from the velocity sensor 16 and signal generator 18 respectively, are applied to a comparator 22 which provides an electrical output signal when the difference between the signals at 17 and 20 indicate that the instantaneous velocity of the rotor 14 is lower than the desired velocity. Comparator 22 is a conventional circuit arrangement and a suitable device is available commercially as National Semiconductor Model LM311. When such a signal is provided at the output 24 of comparator 22, it is applied to a conventional gate circuit 26. A Zero-Crossing Pulse Generator 28 is connected in circuit with power source 12 and gate 26 and with gate 26 "on" due to the presence of a signal from comparator 22, a pulse adapted to be sufficient in duration and amplitude to "turn on" triac 30, is applied from the Pulse Generator 28 whenever the a.c. signal from power source 12 is at zero volts. Gate 26 and Zero-Crossing Pulse Generator 28 are commercially available in one unit, e.g., Motorola Model MFC8070. With each pulse, triac switch A, indicated at 30, is caused to close and short circuit resistor 32 which causes the voltage applied at 34 to drive motor 10 to increase, and hence accelerate and increase the velocity of rotor 14. Since the voltage drop between power source 12 and drive motor 10 is decreased upon the short circuiting of resistor 32. Triac 30 and the other triac devices shown in the drawing are conventional commercially available devices which, upon the application of an appropriate electrical signal to its gate input will turn on and pass an electrical current until such current is interrupted, i.e. goes to zero, due to external means. Since the voltage dropping resistor 32 is shunted or short circuited, as above-noted, at the point in time when the voltage from power source 12 is instantaneously at a zero volts level, abrupt change in the voltage applied due to shunting of resistor 32, is avoided, thus providing a smooth increase in rotor acceleration as the line voltage increases from zero. Also an abrupt rise in line current is avoided by the above-described arrangement which eliminates the development of an abrupt variation electromagnetic radiation from the current carrying conductor which otherwise could detrimentally affect the operation of nearby electrical equipment by the development of transients and the like. When the velocity of drive motor 10 reaches its steady or design value, the output of velocity sensor means 16 levels off accordingly and triac switch (A) indicated at 30 remains closed and resistor 32 remains short circuited and full line voltage is applied to motor 10. To initiate the above described operation, manual switch 34 is actuated and turns on triac B, indicated at 36, by the application of voltage from A.C. Power Source 12 through dropping resistor 13 which permits A.C. power to energize drive motor. Also ramp signal generator 18 is initialized for the next operation of the rotor 14 upon the actuation of switch 34 as indicated.

Figure 2:
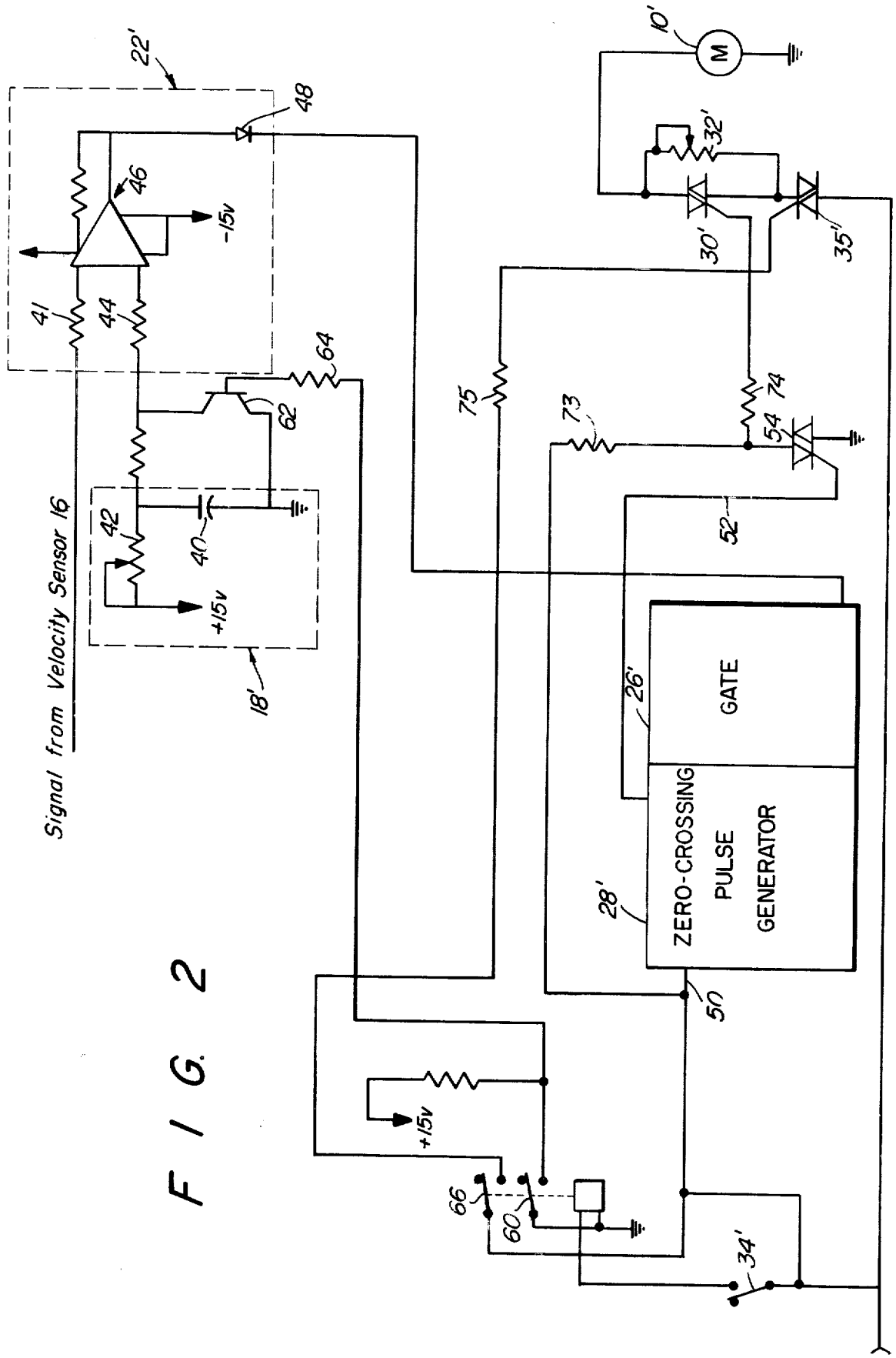

With reference to FIG. 2, a more specific embodiment of the control circuit present invention is illustrated wherein the electrical signal from a velocity sensing means, such as a tachometer, corresponding to the instantaneous velocity of a rotor, is applied to input resistor 41 of comparator 22'. A conventional ramp generator 18' is shown comprising capacitor 40 and variable resistor 42 in circuit with a D.C. power source 70 and having values which determine a time constant such that the voltage signal applied at input resistor 44 of comparator 22' corresponds to the desired acceleration of the rotor. The electrical signals applied at input resistors 41 and 44 are compared in comparator unit 46, which can be a commercially available National Semiconductor Model LM-311 and an output signal will be provided when there is a difference in the input signals. The output of comparator unit 46 is applied to diode 48 arranged so as to be conductive when the velocity sensing signal at input resistor 41 is less than the ramp generator signal at input resistor 41 is less than the ramp generator signal at input resistor 44, indicating that the rotor acceleration is less than desired. The electrical signal passed by diode 48 is applied to Gate 26'. Gate 26' and Zero-Crossing Pulse generator 28' are shown combined as one unit which is commercially available as Motorola Model MFC 8070. With manual switch 34' closed, and signal applied to gate 26' as described, pulses will be generated by Zero Crossing Pulse generator 28' whenever A.C. power supply voltage applied at 50 passes through zero volt level. The generated pulses are applied via connector 52 to boosting triac 54 which cause corresponding pulses of higher power level to be applied to triac 30' which shortcircuits resistor 32' and thus causes the voltage applied to drive motor 10' to be increased and cause an increase in drive motor acceleration as hereinbefore described in connection with FIG. 1. Triac 35' is de-energized upon the opening of manual switch 34' which opens relay 66 and removes A.C. voltage from drive motor 10'. Also upon the opening of manual switch 34' relay 60 is opened which returns the components of ramp generator 18' to their initial state via transistor 62 and resistor 64. In FIG. 2, resistor 73 is a conventional load resistor for triac 54 and resistors 74 and 75 are conventional load resistors.

What is claimed is:

1. A circuit for controlling the acceleration of a rotor coupled to an electrical motor adapted to be energized by a.c. voltage power source said circuit comprising
   i. means for providing a first electrical signal corresponding to the actual acceleration of said rotor
   ii. means for providing a second electrical signal corresponding to the desired acceleration of said rotor
   iii. means responsive to the aforesaid signals to maintain a third electrical signal while there is a difference between said first and second signals due to said first electrical signal being less than said second electrical signal
   iv. resistance means in circuit with said a.c. voltage power source and said electrical motor
   v. means responsive to said third electrical signal and to said a.c. voltage power source to cause said resistance means to be short circuited when said a.c. voltage power source first goes to zero volts level and to thereafter remain short circuited while said third electrical signal is maintained.

* * * * *